(12) United States Patent
Hente

(10) Patent No.: US 9,485,831 B2
(45) Date of Patent: *Nov. 1, 2016

(54) SUPERVISION CIRCUIT FOR ORGANIC LIGHT EMITTING DIODE

(71) Applicant: OLEDWORKS GMBH, Aachen (DE)

(72) Inventor: Dirk Hente, Wuerselen (DE)

(73) Assignee: OLEDWORKS GMBH, Aachen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,709

(22) Filed: Feb. 17, 2015

(65) Prior Publication Data

US 2015/0163883 A1 Jun. 11, 2015

Related U.S. Application Data

(63) Continuation of application No. 13/809,256, filed as application No. PCT/IB2011/052937 on Jul. 4, 2011, now Pat. No. 8,957,599.

(30) Foreign Application Priority Data

Jul. 9, 2010 (EP) .................................. 10169091

(51) Int. Cl.
   *H05B 33/08* (2006.01)
   *H05B 37/03* (2006.01)

(52) U.S. Cl.
   CPC ........ *H05B 33/0896* (2013.01); *H05B 33/089* (2013.01); *H05B 37/03* (2013.01); *Y02B 20/341* (2013.01)

(58) Field of Classification Search
   CPC .......... H05B 33/0815; H05B 33/0818; H05B 33/0884; H05B 33/0809; H05B 33/0848; H05B 33/0896; H05B 33/0803

USPC .................... 315/120, 247, 291, 307; 345/76
See application file for complete search history.

(56) References Cited

U.S. PATENT DOCUMENTS

| 6,153,980 A | 11/2000 | Marshall et al. |
| 6,714,140 B2 | 3/2004 | Eguiluz Fernandez |

(Continued)

FOREIGN PATENT DOCUMENTS

| DE | 10358447 B3 | 5/2005 |
| JP | 2010-272410 A | 12/2010 |

(Continued)

*Primary Examiner* — Douglas W Owens
*Assistant Examiner* — Syed M Kaiser
(74) *Attorney, Agent, or Firm* — Rossi, Kimms & McDowell LLP (57) ABSTRACT

The invention relates to supervision circuits (10) for supervising organic light emitting diode devices (1) via detection circuits (20) for detecting failure states of the organic light emitting diode devices (1) and for generating decision signals in response to detected failure states of the organic light emitting diode devices (1), which detected failure states have durations equal to or larger than time intervals. In response to the decision signals, the organic light emitting diode devices (1) can be bypassed and deactivated through switching circuits (30) such as bi-stable circuits. The failure states may include that the organic light emitting diode devices (1) have a relatively low impedance or "short" and a relatively high impedance or "open". The supervision circuit (10) further prevents the organic light emitting diode devices (1) from being bypassed unjustly. The supervision circuits (10) may be autonomous circuits that only receive power via the organic light emitting diode devices (1) and may be automatic circuits that automatically reset themselves after turn-off.

9 Claims, 7 Drawing Sheets

(56) References Cited

U.S. PATENT DOCUMENTS

| | | |
|---|---|---|
| 7,425,943 B2 | 9/2008 | Furukawa |
| 7,636,037 B2 * | 12/2009 | Ito et al. .................. 340/458 |
| 8,115,383 B2 * | 2/2012 | Cok et al. ................. 313/506 |
| 2005/0174064 A1 * | 8/2005 | Agostinelli et al. ....... 315/169.3 |
| 2008/0164822 A1 * | 7/2008 | Serebryanov et al. ...... 315/129 |
| 2010/0049454 A1 | 2/2010 | Irissou et al. |
| 2010/0060175 A1 * | 3/2010 | Lethellier ................. 315/164 |
| 2010/0181918 A1 * | 7/2010 | Wu et al. .................. 315/120 |
| 2010/0264828 A1 * | 10/2010 | Cortigiani et al. .......... 315/130 |
| 2011/0080397 A1 * | 4/2011 | Yamamoto et al. ......... 345/214 |
| 2011/0242868 A1 * | 10/2011 | Gray et al. ................. 363/131 |
| 2012/0098430 A1 * | 4/2012 | Inoue et al. ................ 315/82 |

FOREIGN PATENT DOCUMENTS

| | | | |
|---|---|---|---|
| JP | 2011-204628 A | 10/2011 | |
| WO | 2009013675 A1 | 1/2009 | |
| WO | WO 2009013675 A1 * | 1/2009 | ............ H05B 33/08 |
| WO | 2010039046 A2 | 4/2010 | |
| WO | 2010051832 A1 | 5/2010 | |
| WO | WO 2010051832 A1 * | 5/2010 | ............ H05B 33/08 |

* cited by examiner

10: Supervision Cir., 11: Supervision Cir., 40: System, 1: OLED, 2: OLED

FIG. 11

10: Supervision Cir., 31: Thyristor; 111-112: Resistors, 211: Transistor, 311: Resistor, 312: Capacitor

SUPERVISION CIRCUIT FOR ORGANIC LIGHT EMITTING DIODE

FIELD OF THE INVENTION

The invention relates to a supervision circuit for supervising an organic light emitting diode device.

The invention further relates to a system comprising the supervision circuit and to a method of supervising an organic light emitting diode device. Examples of such a system are lamps and other light emitting diode systems.

BACKGROUND OF THE INVENTION

US 2005/0174064 A1 discloses an organic light emitting diode apparatus having an improved fault tolerance. To achieve this, a passive current-limiting component is connected serially to an electroluminescent diode, such that the likelihood of a dark organic light emitting diode line defect in a display is reduced. This is a passive solution.

SUMMARY OF THE INVENTION

It is an object of the invention to provide a supervision circuit for supervising an organic light emitting diode device in a more active way. Further objects are to provide a system and a method.

According to a first aspect, a supervision circuit for supervising an organic light emitting diode device is provided, the supervision circuit comprising
a detection circuit for detecting a failure state of the organic light emitting diode device and for generating, in response to a detected failure state that has a duration equal to or larger than a time-interval, a decision signal, and
a switching circuit for, in response to the decision signal, bypassing the organic light emitting diode device.

The detection circuit detects a failure state of the organic light emitting diode device. Such a failure state may include that the organic light emitting diode device has a relatively low or too low impedance, which is also known as a "short". Alternatively, such a failure state may include that the organic light emitting diode device has a relatively high or too high impedance, which is also known as an "open". If the organic light emitting diode device forms part of a system comprising a string of organic light emitting diode devices fed via a constant current driver, a "short" may result in a hot spot owing to the fact that a local power density may get a value that is relatively high or too high, which hot spot may further damage the system and/or may be dangerous to a human being, and an "open" may result in the entire string being deactivated. In response to the detection of such a failure state, under the condition that it has a duration equal to or larger than a time-interval, a decision signal is generated. In response to the decision signal, the switching circuit bypasses the organic light emitting diode device. This way, the organic light emitting diode device is supervised in a more active way.

The supervision circuit is further advantageous in that said condition that the failure state should have a duration equal to or larger than a time interval may prevent the organic light emitting diode device from being bypassed unjustly, for example in response to a transition such as a turn-on and/or in response to a varying current from a constant current driver such as an AC current or a current with a ripple.

The organic light emitting diode device may comprise one or more organic light emitting diode units connected serially and/or in parallel. The time interval is a minimum time interval larger than zero.

An embodiment of the supervision circuit is defined by the detection circuit being arranged for detecting a further failure state of the organic light emitting diode device and for generating, in response to a detected further failure state that has a further duration equal to or larger than a further time-interval, a further decision signal, and the switching circuit being arranged for, in response to the further decision signal, bypassing the organic light emitting diode device, the failure state being a short defect, and the further failure state being an open defect. This supervision circuit is advantageous in that it can react to both failure states, to an "open" as well as a "short", and in that for each failure state an individual time interval may be selected. The further time interval is a further minimum time interval larger than zero.

An embodiment of the supervision circuit is defined by the switching circuit comprising, in a conducting mode, a relatively low resistance path showing at a certain current a forward voltage drop smaller than a forward voltage drop of the organic light emitting diode device at the same certain current, and comprising, in a non-conducting mode, a relatively high resistance path showing at a certain voltage a leakage current smaller than an organic light emitting diode device current at the same certain voltage. This supervision circuit is advantageous in that both well-defined modes allow the supervision circuit to function more optimally.

An embodiment of the supervision circuit is defined by the switching circuit being a bi-stable switching circuit that in response to the decision signal and/or the further decision signal is switched from the non-conducting mode into the conducting mode and that is switched back from the conducting mode into the non-conducting mode as soon as the certain current that flows through the switching circuit falls below a minimum value. The bi-stable switching circuit only requires a pulse to be switched from the non-conducting mode into the conducting mode and is not switched back from the conducting mode into the non-conducting mode before turn-off.

An embodiment of the supervision circuit is defined by the supervision circuit being an autonomous circuit that only receives power via the organic light emitting diode device and that does not receive any further power, and the supervision circuit being an automatic circuit that automatically resets itself after turn-off of the organic light emitting diode device and that then automatically sets itself after turn-on of the organic light emitting diode device. This supervision circuit is advantageous in that it is an autonomous circuit as well as an automatic circuit.

An embodiment of the supervision circuit is defined by the detection circuit comprising a first circuit for deriving a derived voltage from an operating voltage across the organic light emitting diode device, and comprising a second circuit for comparing the derived voltage with a reference voltage such that the failure state of the organic light emitting diode device can be detected via a too low derived voltage, and comprising a third circuit for integrating or low-pass filtering or delaying an output signal from the second circuit such that, in response to the detected failure state that has a duration equal to or larger than the time interval, the decision signal can be generated, and the switching circuit comprising a thyristor or a triac or a transistor or a relay such that in response to the decision signal the organic light emitting diode device can be bypassed. The operating voltage across the organic light emitting diode device is a good indication of a failure state. A failure state in the form of a "short" will result in the derived voltage having a relatively low or too low value. The integrating or low-pass filtering or delaying allows the time interval to be created and defined.

An embodiment of the supervision circuit is defined by the first circuit comprising a resistor divider, the second circuit comprising a comparator or an operational amplifier or a transistor or a microcontroller, and the third circuit comprising an integrating circuit or a filtering circuit or a delaying circuit.

An embodiment of the supervision circuit is defined by the detection circuit comprising a fourth circuit for deriving a derived voltage and a further derived voltage from an operating voltage across the organic light emitting diode device, and comprising a fifth circuit for comparing the derived voltage with a reference voltage such that the failure state of the organic light emitting diode device can be detected via a too low derived voltage, and comprising a sixth circuit for integrating or low-pass filtering or delaying an output signal from the fifth circuit such that, in response to the detected failure state that has a duration equal to or larger than the time interval, the decision signal can be generated, and comprising a seventh circuit for comparing the further derived voltage with a further reference voltage such that the further failure state of the organic light emitting diode device due to a too high further derived voltage can be detected, and comprising an eighth circuit for integrating or low-pass filtering or delaying an output signal from the seventh circuit such that, in response to the detected further failure state that has a further duration equal to or larger than the further time-interval, the further decision signal can be generated, and the switching circuit comprising a thyristor or a triac or a transistor or a relay such that, in response to the decision signal and/or the further decision signal, the organic light emitting diode device can be bypassed. The operating voltage across the organic light emitting diode device is a good indication of a failure state. A failure state in the form of a "short" will result in the derived voltage having a relatively low or too low value. A failure state in the form of an "open" will result in the derived voltage having a relatively high or too high value. The integrating or low-pass filtering or delaying allows the time-intervals to be created and defined.

An embodiment of the supervision circuit is defined by the fourth circuit comprising a resistor divider, the fifth and seventh circuits each or together comprising a comparator or an operational amplifier or a transistor or a microcontroller, and the sixth and eighth circuits each or together comprising an integrating circuit or a filtering circuit or a delaying circuit.

An embodiment of the supervision circuit is defined by the reference voltage and the further reference voltage being identical and/or being derived via the same element. This is a low-cost solution.

An embodiment of the supervision circuit is defined by the detection circuit comprising a microcontroller. This is a flexible solution.

According to a second aspect, a system is provided comprising the supervision circuit and further comprising the organic light emitting diode device coupled in parallel to the supervision circuit.

An embodiment of the system is defined in that it further comprises a further organic light emitting diode device connected to the organic light emitting diode device so as to form a string, wherein said string is coupled in parallel to the supervision circuit and is supervised by this supervision circuit or wherein the further organic light emitting diode device is coupled in parallel to a further supervision circuit and is supervised by this further supervision circuit. One supervision circuit for two or more organic light emitting diode devices is a low-cost solution, but if only one of the organic light emitting diode devices shows a failure, both will be bypassed and deactivated. One supervision circuit per organic light emitting diode device is a more expensive solution, but if only one of the organic light emitting diode devices shows a failure, only this one will be bypassed and deactivated, and the others will not be bypassed and will remain activated.

An embodiment of the system is defined by the organic light emitting diode device being connectable to a constant current driver for supplying a DC current or an AC current or a current with a ripple to the organic light emitting diode device.

According to a third aspect, a method is provided for supervising an organic light emitting diode device, the method comprising
detecting a failure state of the organic light emitting diode device and generating, in response to a detected failure state that has a duration equal to or larger than a time interval, a decision signal, and
in response to the decision signal, bypassing the organic light emitting diode device.

An insight could be that a start of a failure state may be non-different from a start of a non-failure state and that, to avoid confusion, action is not to be taken immediately but only after an elapse of a time interval.

A basic idea could be that in response to a detected failure state that has a duration equal to or larger than a time interval, an organic light emitting diode device is to be bypassed.

The problem of providing a supervision circuit for supervising an organic light emitting diode device in a more active way has been solved.

A further advantage could be that said condition may prevent the organic light emitting diode device from being bypassed unjustly.

These and other aspects of the invention will be apparent from and elucidated with reference to the embodiments described hereinafter.

DETAILED DESCRIPTION OF EMBODIMENTS

A failure state of an organic light emitting diode device may include that the organic light emitting diode device has a relatively low impedance or a too low impedance or a "lower than normal" impedance, which is also known as a "short". Alternatively, such a failure state may include that the organic light emitting diode device has a relatively high impedance or a too high impedance or a "higher than normal" impedance, which is also known as an "open". If the organic light emitting diode device forms part of a system comprising a string of organic light emitting diode devices fed via a constant current driver, a "short" in one of the organic light emitting diode devices may result in a hot spot owing to the fact that a local power density may get a relatively high or too high value, which hot spot may further damage the system and/or may be dangerous to a human being. In the case of an ideal "short", a zero voltage will be present across the defective organic light emitting diode device, but more practically, in the case of a non-ideal "short", a voltage smaller than an operating voltage (a normal voltage) will be present across the defective organic light emitting diode device, and this can be detected, either across the defective organic light emitting diode device, or across the entire string. In the case of the organic light emitting diode device forming part of a system comprising a string of organic light emitting diode devices fed via a constant current driver, an "open" in one of the organic light emitting diode devices may result in the entire string being deactivated. In the case of an ideal "open", an infinite voltage will be present across the defective organic light emitting diode device, but more practically, in the case of a non-ideal "open", a voltage larger than an operating voltage (a normal voltage) will be present across the defective organic light emitting diode device, and this can be detected, either across the defective organic light emitting diode device, or across the entire string.

Figure 1:
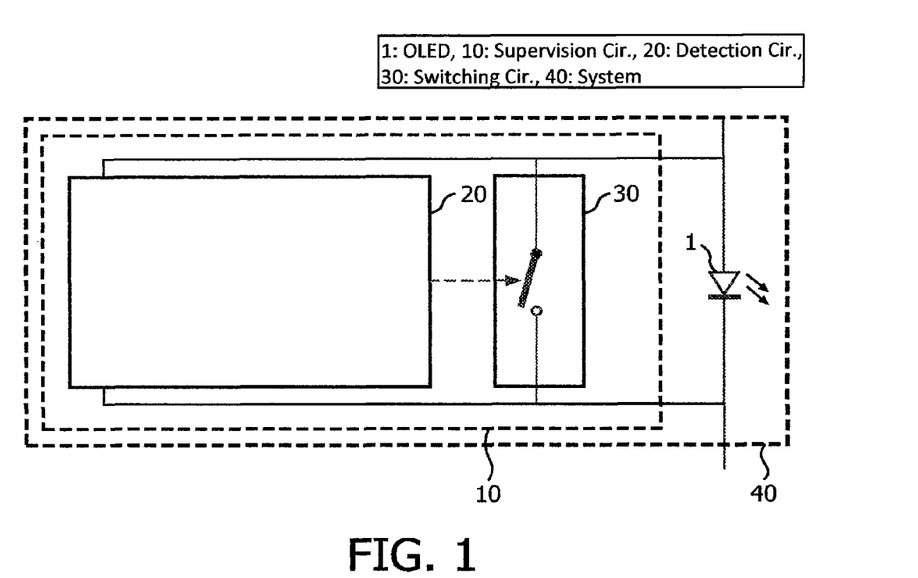
FIG. 1 shows a system comprising a supervision circuit.

In FIG. 1, a system 40 is shown comprising a supervision circuit 10 coupled in parallel to an organic light emitting diode device (OLED) 1. The supervision circuit (Cir.) 10 comprises a detection circuit 20 for detecting a failure state of the organic light emitting diode device 1 and for in response to a detected failure state that has a duration equal to or larger than a time-interval generating a decision signal. The supervision circuit 10 further comprises a switching circuit 30 for in response to the decision signal bypassing the organic light emitting diode device 1. The switching circuit 30 is coupled in parallel to the detection circuit 20.

Figure 2:
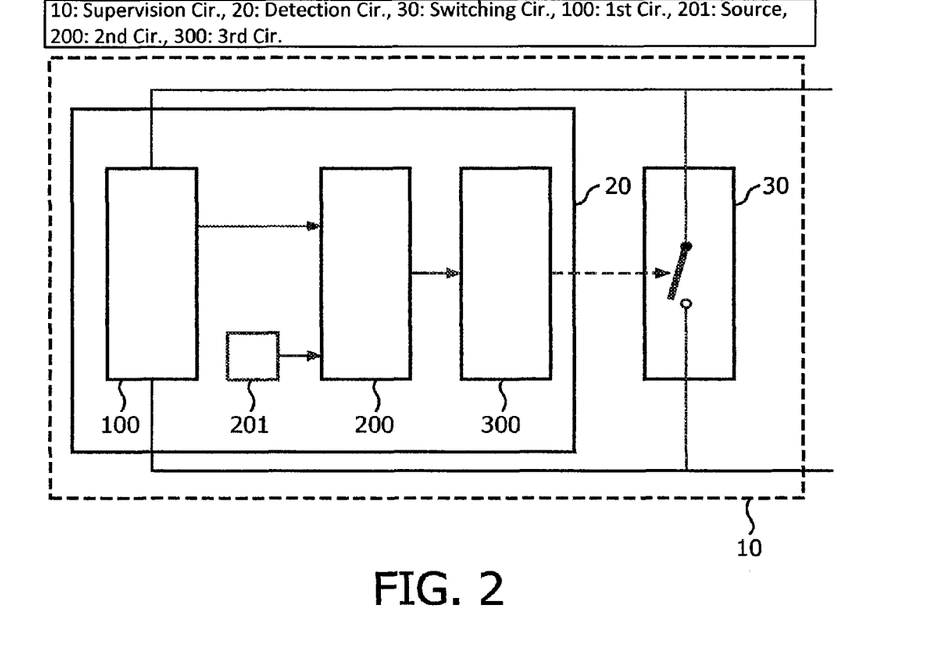
FIG. 2 shows a first embodiment of a supervision circuit.

In FIG. 2, a first embodiment of a supervision circuit 10 is shown. According to this first embodiment, the detection circuit 20 comprises a first (1st) circuit 100 for deriving, from an operating voltage across the organic light emitting diode device 1, a derived voltage, and comprises a second (2nd) circuit 200 for comparing the derived voltage with a reference voltage such that the failure state of the organic light emitting diode device 1 can be detected via a too low derived voltage. Said reference voltage is for example supplied by a source 201 and/or is derived from the operating voltage across the organic light emitting diode device 1. The detection circuit 20 further comprises a third (3rd) circuit 300 for integrating or low-pass filtering or delaying an output signal from the second circuit 200 such that, in response to the detected failure state that has a duration equal to or larger than the time-interval, the decision signal can be generated. The switching circuit 30 comprises for example a thyristor or a triac or a transistor or a relay such that in response to the decision signal the organic light emitting diode device 1 can be bypassed. The first circuit 100 comprises for example a resistor divider, the second circuit 200 comprises for example a comparator or an operational amplifier or a transistor or a microcontroller, and the third circuit 300 comprises for example an integrating circuit or a filtering circuit or a delaying circuit.

Figure 3:
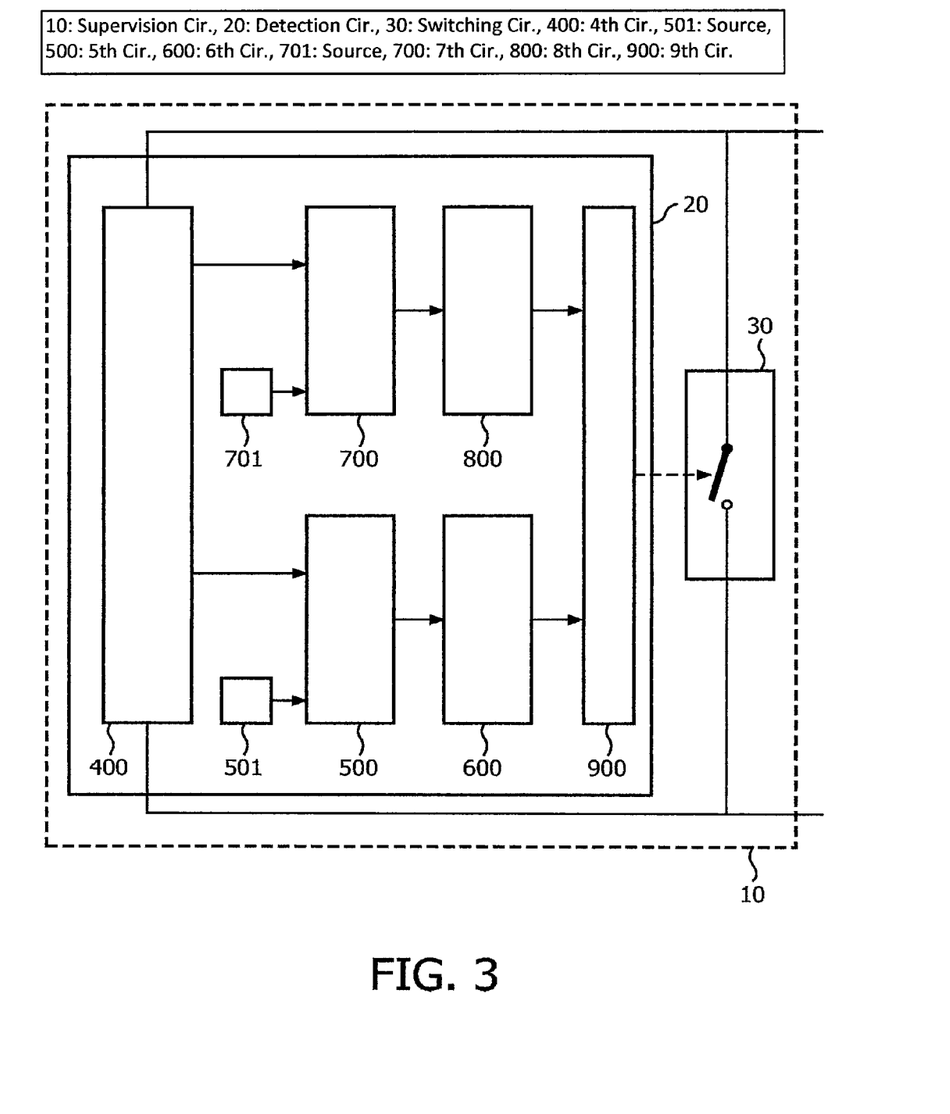
FIG. 3 shows a second embodiment of a supervision circuit.

In FIG. 3, a second embodiment of a supervision circuit 10 is shown. According to this second embodiment, the detection circuit 20 comprises a fourth (4th) circuit 400 for deriving a derived voltage and a further derived voltage from an operating voltage across the organic light emitting diode device 1, and comprises a fifth (5th) circuit 500 for comparing the derived voltage with a reference voltage such that the failure state of the organic light emitting diode device 1 can be detected via a too low derived voltage. Said reference voltage is for example supplied by a source 501 and/or is derived from the operating voltage across the organic light emitting diode device 1. The detection circuit 20 further comprises a sixth (6th) circuit 600 for integrating or low-pass filtering or delaying an output signal from the fifth circuit 500 such that in response to the detected failure state that has a duration equal to or larger than the time interval, the decision signal can be generated. The detection circuit 20 further comprises a seventh (7th) circuit 700 for comparing the further derived voltage with a further reference voltage such that the further failure state of the organic light emitting diode device 1 can be detected via a too high further derived voltage. Said further reference voltage is for example supplied by a source 701 and/or is derived from the operating voltage across the organic light emitting diode device 1. The detection circuit 20 further comprises an eighth (8th) circuit 800 for integrating or low-pass filtering or delaying an output signal from the seventh circuit 700 such that, in response to the detected further failure state that has a further duration equal to or larger than the further time interval, the further decision signal can be generated. Output signals from the sixth and eighth circuits 600 and 800 are combined (for example via an OR operation or an adding operation) via a ninth (9th) circuit 900 that controls the switching circuit 30. The switching circuit 30 comprises for example a thyristor or a triac or a transistor or a relay such that in response to the decision signal and/or the further decision signal the organic light emitting diode device 1 can be bypassed. The fourth circuit 400 comprises for example a resistor divider, the fifth and seventh circuits 500, 700 each or together comprise for example a comparator or an operational amplifier or a transistor or a microcontroller, and the sixth and eighth circuits 600, 800 each or together comprise for example an integrating circuit or a filtering circuit or a delaying circuit. Preferably, the reference voltage and the further reference voltage are identical and/or are derived via the same element, such as for example a temperature compensated voltage reference and/or a band-gap reference.

Figure 4:
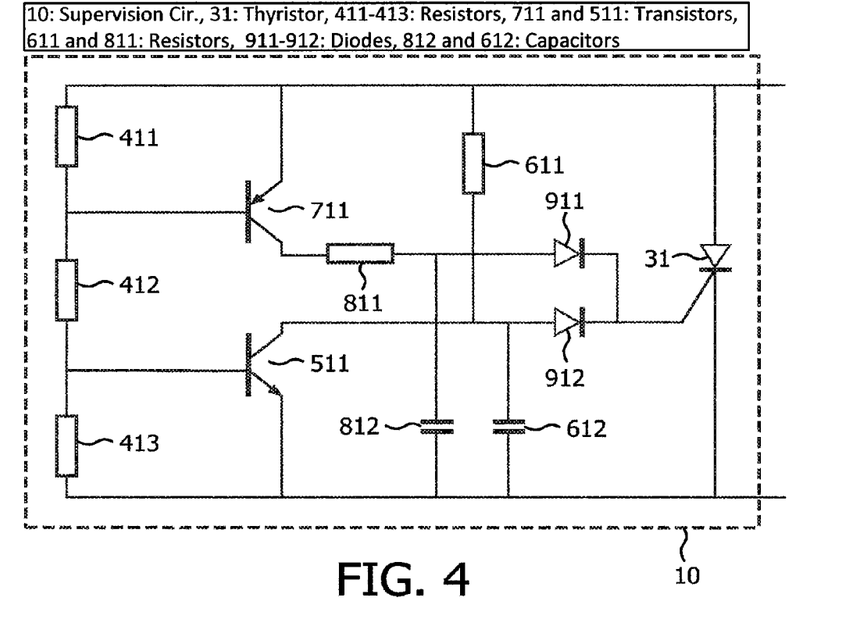
FIG. 4 shows a first implementation of the second embodiment.

In FIG. 4, a first implementation of the second embodiment is shown. According to this first implementation, three resistors 411-413 are coupled serially to each other and together form a voltage divider that is coupled in parallel to the organic light emitting diode device (not shown here). The three resistors 411-413 form a possible realization of the fourth circuit 400 shown in FIG. 3. An interconnection between the resistors 411 and 412 is coupled to a control electrode of a transistor 711. A first main electrode of the transistor 711 is coupled to another side of the resistor 411, and a second main electrode is coupled via a resistor 811 to an anode of a diode 911. An interconnection between the resistors 412 and 413 is coupled to a control electrode of a transistor 511. A first main electrode of the transistor 511 is coupled to another side of the resistor 413, and a second main electrode is coupled to an anode of a diode 912. The anode of the diode 911 is further coupled via a capacitor 812 to the other side of the resistor 413, and the anode of the diode 912 is further coupled via a capacitor 612 to the other side of the resistor 413 and via a resistor 611 to the other side of the resistor 411. The cathodes of the diodes 911 and 912 are coupled to each other and to a control electrode of a thyristor 31. Main electrodes of the thyristor 31 are coupled to the other sides of the resistors 411 and 413. The transistor 711 forms a possible realization of the seventh circuit 700 shown in FIG. 3. The transistor 511 forms a possible realization of the fifth circuit 500 shown in FIG. 3. The resistor 811 and the capacitor 812 form a possible realization of the eighth circuit 800 shown in FIG. 3. The resistor 611 and the capacitor 612 form a possible realization of the sixth circuit 600 shown in FIG. 3. The diodes 911 and 912 form a possible realization of the ninth circuit 900 shown in FIG. 3. The diodes 911 and 912 combine the output signals from the previous circuits for example according to an OR operation or an adding operation in such a way that the integration times realized via the capacitors 612 and 812 are decoupled from each other. As a result, the time intervals can be selected independently of each other. Finally, the transistor voltages present between the control electrode and the first main electrode of each transistor 511 and 711 are used as the reference voltages, so here the transistors 511 and 711 further form possible realizations of the circuits 501 and 701 shown in FIG. 3.

Exemplary values for FIG. 4 may be that, for an integration time-constant τ=RC for the circuit 800, τ(open)=τ(high)=100 msec, a delay reaction to an "open" can be about 6 msec, and for an integration time-constant τ=RC for the circuit 600, τ(short)=τ(low)=20 msec, a delay reaction to a "short" can be about 6 msec. For an integration time-constant τ=RC for the circuit 800, τ(open)=τ(high)=100 μsec, a delay reaction to an "open" can be about 6 μsec, and for an integration time-constant τ=RC for the circuit 600, τ(short)=τ(low)=20 msec, a delay reaction to a "short" can be about 6 msec. And for an integration time-constant τ=RC for the circuit 800, τ(open)=τ(high)=100 msec, a delay reaction to an "open" can be about 6 msec, and for an integration time-constant τ=RC for the circuit 600, τ(short)=τ(low)=100 msec, a delay reaction to a "short" can be about 30 msec. Of course, other values are possible and not to be excluded.

Figure 5:
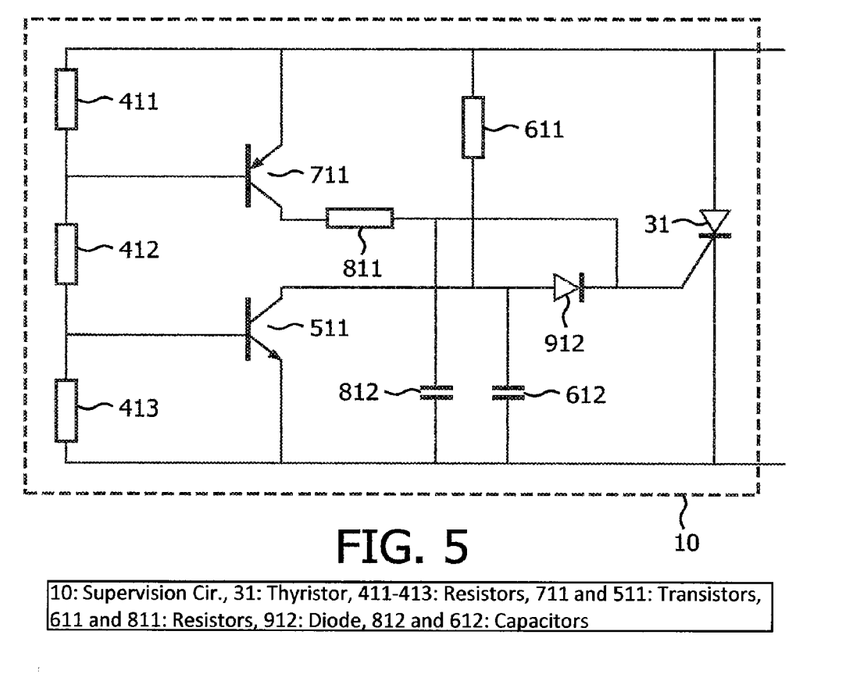
FIG. 5 shows a second implementation of the second embodiment.

In FIG. 5, a second implementation of the second embodiment is shown. This second implementation only differs from the first implementation in that the diode 911 has been replaced by a connection. Behind the diode 912, the output signals from the previous circuits are combined. As a result, the integration times realized via the capacitors 612 and 812 are no longer decoupled from each other.

Exemplary values for FIG. 5 may be that, for an integration time-constant t=RC for the circuit 800, τ(open)=τ(high)=100 msec, a delay reaction to an "open" can be about 2 msec, and for an integration time-constant τ=RC for the circuit 600, τ(short)=τ(low)=20 msec, a delay reaction to a "short" can be about 9 msec. Of course, other values are possible and not to be excluded.

Figure 6:
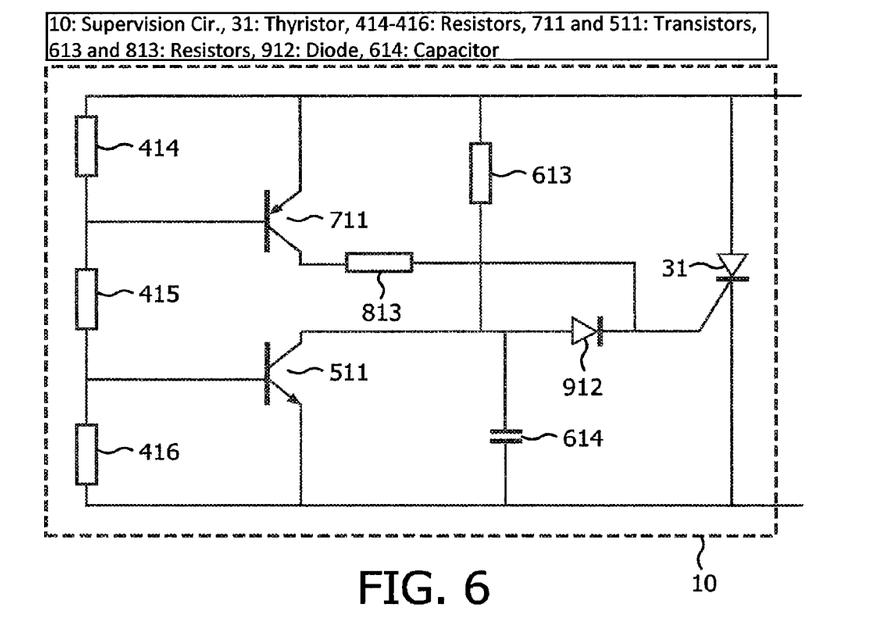
FIG. 6 shows a third implementation of the second embodiment.

In FIG. 6, a third implementation of the second embodiment is shown. According to this third implementation, three resistors 414-416 are coupled serially to each other and together form a voltage divider that is coupled in parallel to the organic light emitting diode device (not shown here). The three resistors 414-416 form a possible realization of the fourth circuit 400 shown in FIG. 3. An interconnection between the resistors 414 and 415 is coupled to a control electrode of a transistor 711. A first main electrode of the transistor 711 is coupled to another side of the resistor 414, and a second main electrode is coupled via a resistor 813 to a cathode of a diode 912. An interconnection between the resistors 415 and 416 is coupled to a control electrode of a transistor 511. A first main electrode of the transistor 511 is coupled to another side of the resistor 416, and a second main electrode is coupled to an anode of the diode 912. The anode of the diode 912 is further coupled via a capacitor 614 to the other side of the resistor 416 and via a resistor 613 to the other side of the resistor 414. The cathode of the diode 912 is further coupled to a control electrode of a thyristor 31. Main electrodes of the thyristor 31 are coupled to the other sides of the resistors 414 and 416. The transistor 711 forms a possible realization of the seventh circuit 700 shown in FIG. 3. The transistor 511 forms a possible realization of the fifth circuit 500 shown in FIG. 3. The resistor 813 forms a possible realization of the eighth circuit 800 shown in FIG. 3. The resistor 613 and the capacitor 614 form a possible realization of the sixth circuit 600 shown in FIG. 3. This clearly shows that when the sixth circuit 600 is present for integrating or low-pass filtering or delaying an output signal from the fifth circuit 500, the eighth circuit 800 is a non-essential circuit owing to the fact that here the eighth circuit 800 only comprises the resistor 813, which is neither an integrating circuit nor a filtering circuit nor a delaying circuit. The diode 912 forms a possible realization of the ninth circuit 900 shown in FIG. 3. Behind the diode 912, the output signals from the previous circuits are combined. The third implementation offers a minimum delay for "open" failures.

Exemplary values for FIG. 6 may be that a delay reaction to an "open" can be about 1 μsec, and for an integration time-constant τ=RC for the circuit 600, τ(short)=τ(low)=20 msec, a delay reaction to a "short" can be about 6 msec. Of course, other values are possible and not to be excluded.

Figure 7:
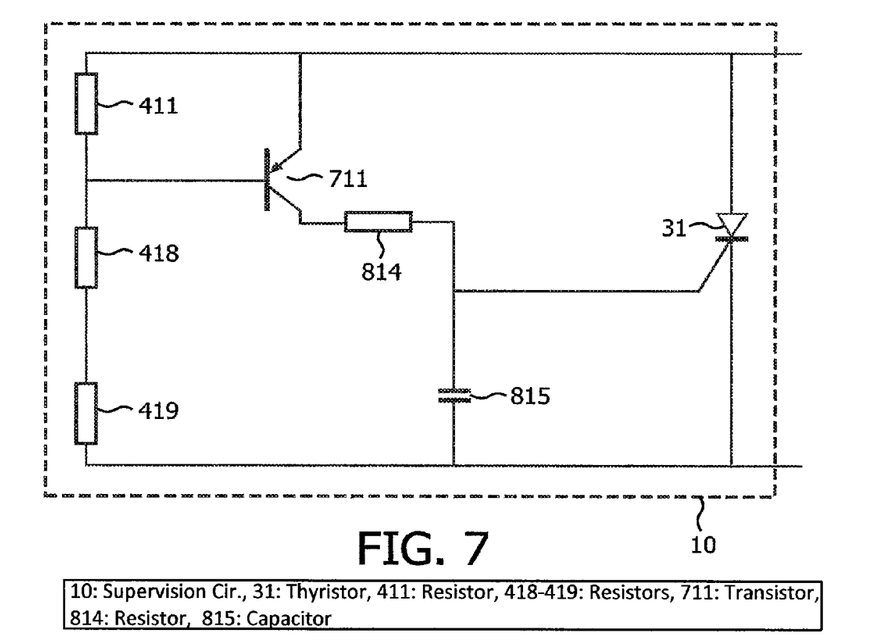
FIG. 7 shows a fourth implementation of the second embodiment.

In FIG. 7, a fourth implementation of the second embodiment is shown. According to this fourth implementation, three resistors 417-419 are coupled serially to each other and together form a voltage divider that is coupled in parallel to the organic light emitting diode device (not shown here). The three resistors 417-419 form a possible realization of the fourth circuit 400 shown in FIG. 3. An interconnection between the resistors 417 and 418 is coupled to a control electrode of a transistor 711. A first main electrode of the transistor 711 is coupled to another side of the resistor 417, and a second main electrode is coupled via a resistor 814 to a control electrode of a thyristor 31. An interconnection between the resistors 418 and 419 is not used here, so both resistors 418 and 419 could be combined. The control electrode of the thyristor 31 is further coupled via a capacitor 815 to another side of the resistor 419. Main electrodes of the thyristor 31 are coupled to the other sides of the resistors 417 and 419. The transistor 711 forms a possible realization of the seventh circuit 700 shown in the FIG. 3. The resistor 814 and the capacitor 815 form a possible realization of the eighth circuit 800 shown in FIG. 3. This clearly shows that when the eighth circuit 800 is present for integrating or low-pass filtering or delaying an output signal from the seventh circuit 700, the fifth and sixth and ninth circuits 500 and 600 and 900, respectively, are non-essential circuits owing to the fact that here they are not present. The fourth implementation can only detect "open" failures.

Figure 8:
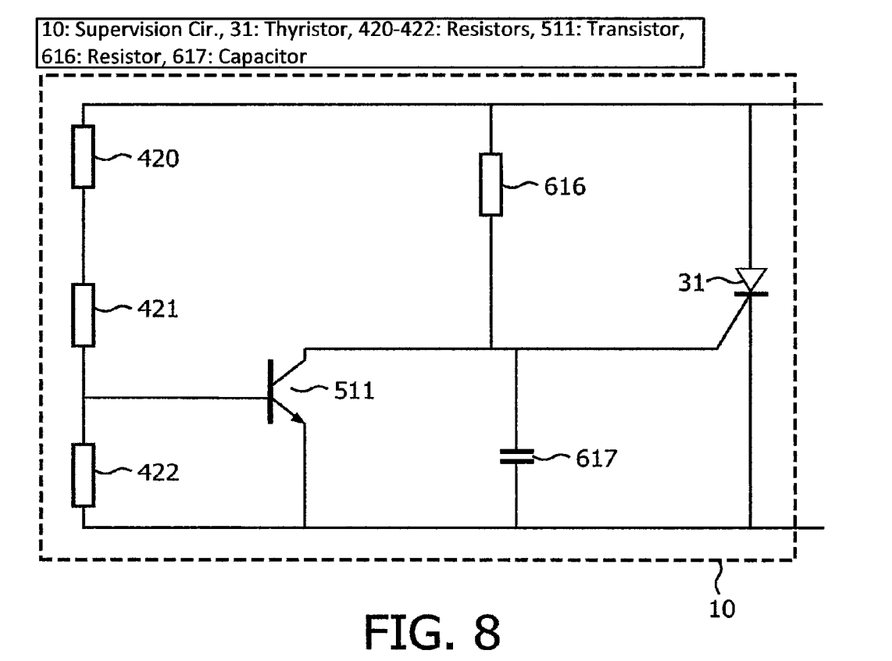
FIG. 8 shows a fifth implementation of the second embodiment.

In FIG. 8, a fifth implementation of the second embodiment is shown. According to this fifth implementation, three resistors 420-422 are coupled serially to each other and together form a voltage divider that is coupled in parallel to the organic light emitting diode device (not shown here). The three resistors 420-422 form a possible realization of the fourth circuit 400 shown in FIG. 3. An interconnection between the resistors 421 and 422 is coupled to a control electrode of a transistor 511. A first main electrode of the transistor 511 is coupled to another side of the resistor 422, and a second main electrode is coupled to a control electrode of a thyristor 31. An interconnection between the resistors 420 and 421 is not used here, so both resistors 420 and 421 could be combined. The control electrode of the thyristor 31 is further coupled via a resistor 616 to another side of the resistor 420 and is further coupled via a capacitor 617 to another side of the resistor 422. Main electrodes of the thyristor 31 are coupled to the other sides of the resistors 420 and 422. The transistor 511 forms a possible realization of the fifth circuit 500 shown in FIG. 3. The resistor 616 and the capacitor 617 form a possible realization of the sixth circuit 600 shown in FIG. 3. This clearly shows that when the sixth circuit 600 is present for integrating or low-pass filtering or delaying an output signal from the fifth circuit 500, the seventh and eighth and ninth circuits 700 and 800 and 900, respectively, are non-essential circuits owing to the fact that here they are not present. The fifth implementation can only detect "short" failures.

Figure 9:
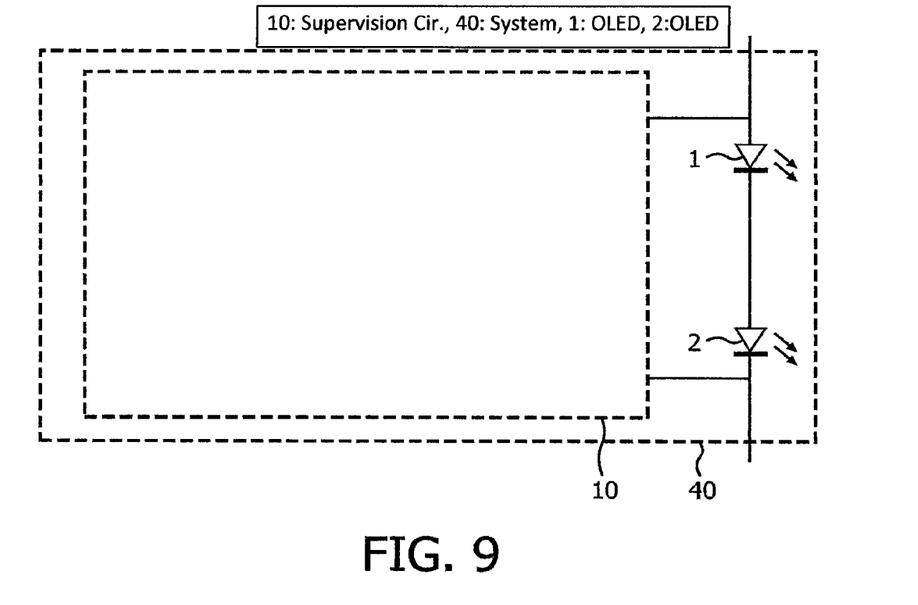
FIG. 9 shows a system comprising one supervision circuit for supervising two organic light emitting diode devices.

In FIG. 9, a system 40 is shown comprising one supervision circuit 10 for supervising two organic light emitting diode devices 1 and 2. This is a low-cost solution, but if only one of the organic light emitting diode devices shows a failure, both will be bypassed and deactivated.

Figure 10:
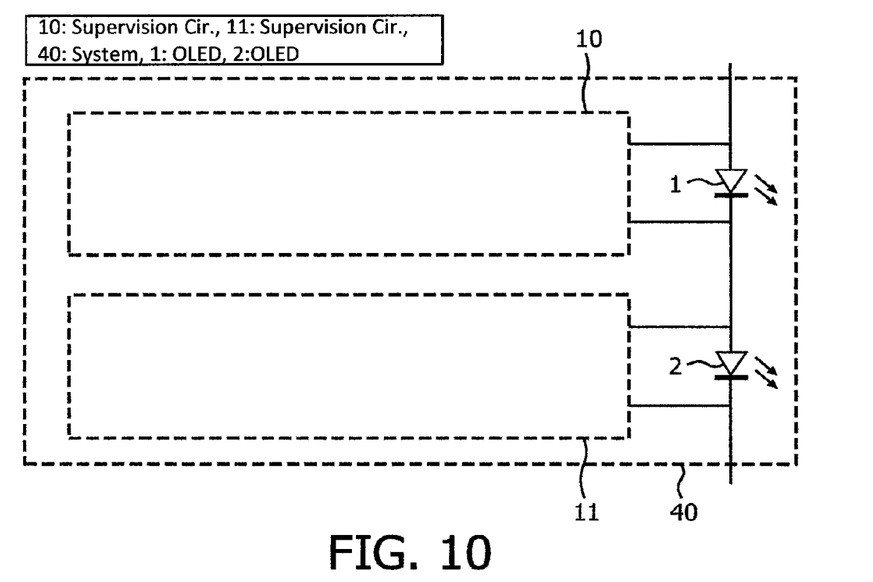
FIG. 10 shows a system comprising two supervision circuits, each being used for supervising its own organic light emitting diode device.

In FIG. 10, a system 40 is shown comprising two supervision circuits 10 and 11, each being used for supervising its own organic light emitting diode device 1 and 2. This is a more expensive solution, but if only one of the organic light emitting diode devices shows a failure, only this one will be bypassed and deactivated, and the other one will not be bypassed and will remain activated.

Figure 11:
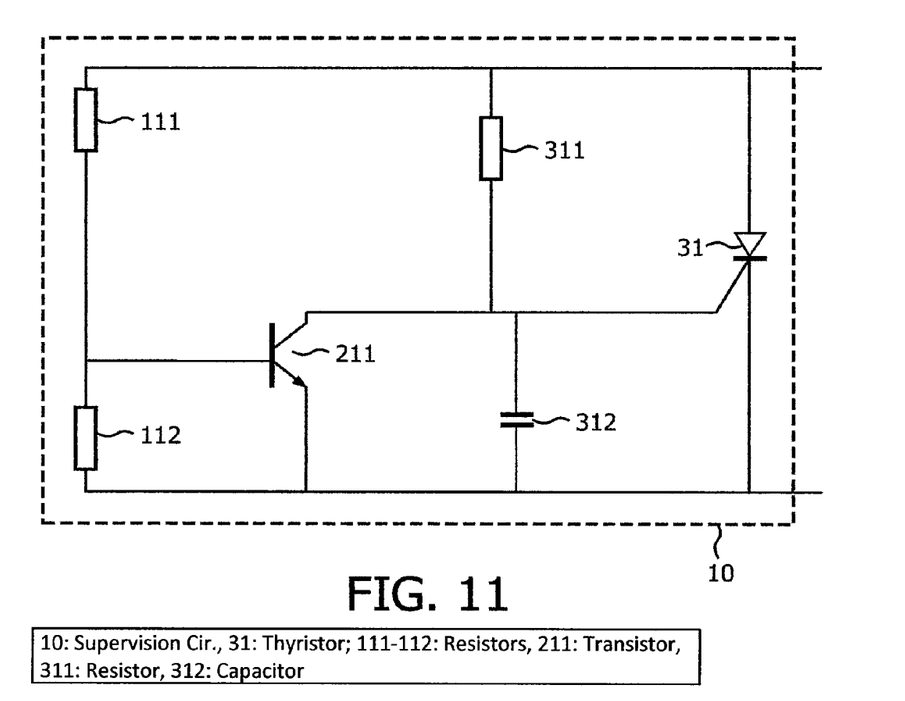
FIG. 11 shows a first implementation of the first embodiment.

In FIG. 11, a first implementation of the first embodiment is shown. According to this first implementation, two resistors 111-112 are coupled serially to each other and together form a voltage divider that is coupled in parallel to the organic light emitting diode device (not shown here). The two resistors 111-112 form a possible realization of the first circuit 100 shown in FIG. 2. An interconnection between the resistors 111 and 112 is coupled to a control electrode of a transistor 211. A first main electrode of the transistor 211 is coupled to another side of the resistor 112, and a second main electrode is coupled to a control electrode of a thyristor 31. The control electrode of the thyristor 31 is further coupled via a resistor 311 to another side of the resistor 111 and is further coupled via a capacitor 312 to another side of the resistor 112. Main electrodes of the thyristor 31 are coupled to the other sides of the resistors 111 and 112. The transistor 211 forms a possible realization of the second circuit 200 shown in FIG. 2. The resistor 311 and the capacitor 312 form a possible realization of the third circuit 300 shown in FIG. 2. Finally, the transistor voltage present between the control electrode and the first main electrode of the transistor 211 is used as reference voltage, so here the transistor 211 further forms a possible realization of the circuit 201 shown in FIG. 2.

Exemplary values for FIG. 11 may be that $R(112)=5\Omega$, $R(111)=30\Omega$, $R(311)=1.2\Omega$, and $C(312)=5$ μF, such that $\tau=RC=6$ msec. Of course, other values are possible and not to be excluded.

Figure 12:
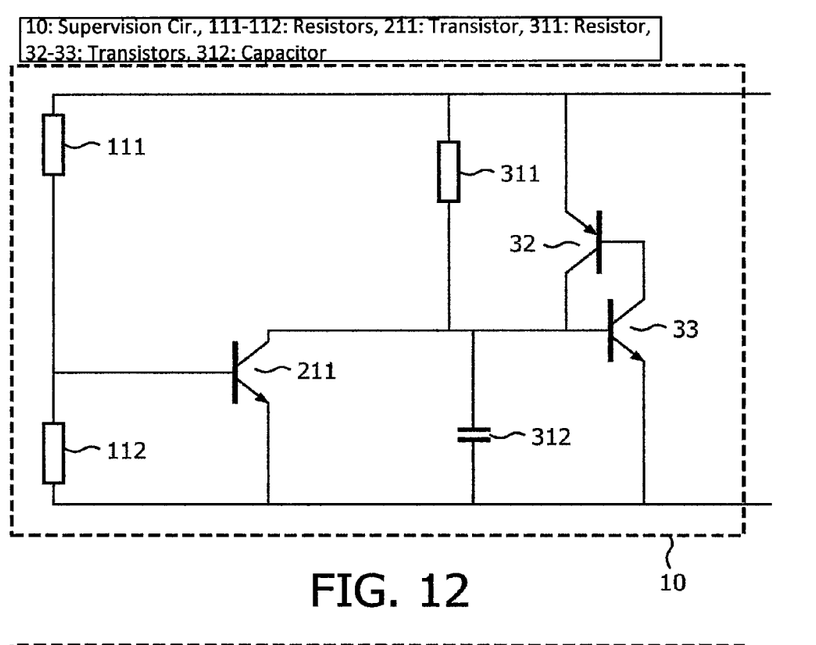
FIG. 12 shows a second implementation of the first embodiment.

In FIG. 12, a second implementation of the first embodiment is shown. This second implementation only differs from the first implementation in that the thyristor 31 has been replaced by two transistors 32 and 33 that simulate the behavior of a thyristor. A first main electrode of the transistor 32 is coupled to the other side of the resistor 111. A second main electrode of the transistor 32 is coupled to a control electrode of the transistor 33 and to the second main electrode of the transistor 211. A first main electrode of the transistor 33 is coupled to the other side of the resistor 112. A control electrode of the transistor 32 is coupled to a second main electrode of the transistor 33.

Figure 13:
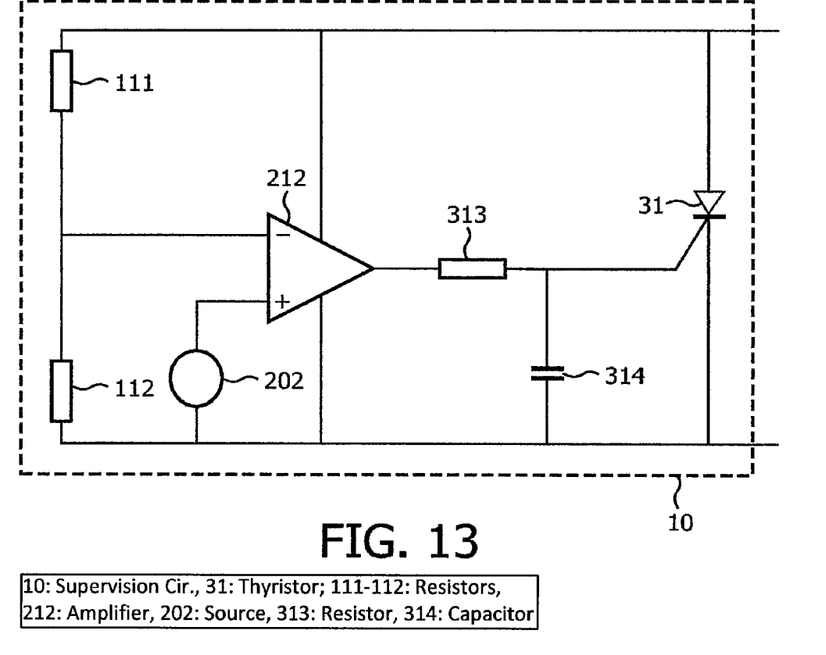
FIG. 13 shows a third implementation of the first embodiment.

In FIG. 13, a third implementation of the first embodiment is shown. This third implementation only differs from the first implementation in that the transistor 211 has been replaced by an operational amplifier 212, wherein an inverting input of the operational amplifier 212 is connected to the interconnection, wherein a non-inverting input of the operational amplifier 212 is connected via a source 202 to the other side of the resistor 112, and wherein an output of the operational amplifier 212 is connected via a resistor 313 to a control electrode of the thyristor 31, which control electrode is further coupled via a capacitor 314 to the other side of the resistor 112. Main electrodes of the thyristor 31 are coupled to the other sides of the resistors 111 and 112 and are coupled to supply terminals of the operational amplifier 212. The operational amplifier 212 forms a possible realization of the second circuit 200 shown in FIG. 2. The resistor 313 and the capacitor 314 form a possible realization of the third circuit 300 shown in FIG. 2. Finally, the source 202 forms a possible realization of the circuit 201 shown in FIG. 2.

In view of FIGS. 4-8 and 11-13, it is clear that with the second embodiment shown in FIG. 3, "open" failures as well as "short" failures can be dealt with, and that with the first embodiment shown in FIG. 2, only one kind of failures can be dealt with, either "open" failures or "short" failures.

Preferably, the switching circuit 30 comprises, in a conducting mode, a relatively low resistance path showing at a certain current a forward voltage drop smaller than a forward voltage drop of the organic light emitting diode device 1 at the same certain current, and/or comprises, in a non-conducting mode, a relatively high resistance path showing at a certain voltage a leakage current smaller than an organic light emitting diode device current at the same certain voltage. To make the supervision circuit 10 more robust, the switching circuit 30 may be a bi-stable switching circuit that in response to the decision signal and/or the further decision signal is switched from the non-conducting mode into the conducting mode and/or that is switched back from the conducting mode into the non-conducting mode as soon as the certain current that flows through the switching circuit 30 falls below a minimum value. Preferably, the supervision circuit 10 is an autonomous circuit that only receives power via (the terminals of) the organic light emitting diode device 1 and that does not receive any further power, and/or the supervision circuit 10 is an automatic circuit that automatically resets itself after turn-off of the organic light emitting diode device 1 and that then automatically sets itself again after turn-on of the organic light emitting diode device 1. Possibly, to make the supervision circuit 10 more flexible, the detection circuit 20 may comprise a microcontroller.

In the Figures, an element is indicated by a reference sign. First and second elements are coupled to each other in the case that they are connected directly to each other and in the case that they are connected indirectly to each other via a third element. Each element may be divided into smaller elements, and several elements may be combined into a larger element. For each Figure, especially for FIGS. 2 and 3, many alternative implementations will be possible. For example the circuits 100 and 400 may alternatively be realized via active circuitry or via a capacitor divider in the case of a constant current driver supplying an AC current to the organic light emitting diode devices. Rectifying elements such as a diode or a rectifier bridge may have to be added. Similarly, for the circuits 200 (possibly with 300) and 500 (possibly with 600) and 700 (possibly with 800), alternatively circuitry may be introduced that is capable of detecting a certain voltage jump (for example through differentiation) (and possibly having a certain duration or a certain derivative per time etc.) such that the sources 201 and 501 and 701 can be avoided etc. Any block shown in FIGS. 1-3 may be a separate integrated circuit or may be part of an integrated circuit and/or any two or more blocks shown in each one of FIGS. 1-3 may be parts of the same integrated circuit or may be parts of different integrated circuits. Finally, any block shown in FIGS. 1-3 may comprise one or more integrated circuits.

Summarizing, the invention relates to supervision circuits 10 for supervising organic light emitting diode devices 1 via detection circuits 20 for detecting failure states of the organic light emitting diode devices 1 and for generating decision signals in response to detected failure states of the organic light emitting diode devices 1, which detected failure states have durations equal to or larger than time intervals. In response to the decision signals, the organic light emitting diode devices 1 can be bypassed and deactivated through switching circuits 30 such as bi-stable circuits. The failure states may include that the organic light emitting diode devices 1 have a relatively low impedance or "short" and a relatively high impedance or "open". The supervision circuit 10 further prevents the organic light emitting diode devices 1 from being bypassed unjustly. The supervision circuits 10 may be autonomous circuits that only receive power via the organic light emitting diode devices 1 and may be automatic circuits that automatically reset themselves after turn-off.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or an does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A supervision circuit for supervising an organic light emitting diode device, the supervision circuit comprising:
   a detection circuit for detecting a first failure state of the organic light emitting diode device and for generating, in response to a detected first failure state that has a duration equal to or larger than a first time-interval, a first decision signal, the first failure state being a short defect, and
   a switching circuit for, in response to the first decision signal, bypassing and deactivating the organic light emitting diode device.

2. The supervision circuit according to claim 1, the supervision circuit being an autonomous circuit that only receives power via the organic light emitting diode device and that does not receive any further power, and the supervision circuit being an automatic circuit that automatically resets itself after turn-off of the organic light emitting diode device and that then automatically sets itself after turn-on of the organic light emitting diode device.

3. The supervision circuit according to claim 1, the detection circuit comprising a first circuit for deriving a derived voltage from an operating voltage across the organic light emitting diode device, and comprising a second circuit for comparing the derived voltage with a reference voltage such that the first failure state of the organic light emitting diode device is detectable via a too low derived voltage, and comprising a third circuit for integrating or low-pass filtering or delaying an output signal from the second circuit such that, in response to the detected first failure state that has a duration equal to or larger than the first time-interval, the first decision signal is generated, and the switching circuit comprising a thyristor or a triac or a transistor or a relay such that in response to the first decision signal the organic light emitting diode device is bypassed and deactivated.

4. The supervision circuit according to claim 3, the first circuit comprising a resistor divider, the second circuit comprising a comparator or an operational amplifier or a transistor or a microcontroller, and the third circuit comprising an integrating circuit or a filtering circuit or a delaying circuit.

5. The supervision circuit according to claim 1, the detection circuit comprising a microcontroller.

6. A system comprising the supervision circuit according to claim 1, and further comprising the organic light emitting diode device coupled in parallel to the supervision circuit.

7. The system according to claim 6, wherein the organic light emitting diode device is a first organic light emitting diode device and wherein the system further comprises a further organic light emitting diode device connected to the first organic light emitting diode device so as to form a string, wherein the string is coupled in parallel to the supervision circuit and is supervised by this supervision circuit or wherein the further organic light emitting diode device is coupled in parallel to a further supervision circuit and is supervised by this further supervision circuit.

8. The system according to claim 6, the organic light emitting diode device being connectable to a constant current driver for supplying a DC current or an AC current or a current with a ripple to the organic light emitting diode device.

9. A method of supervising an organic light emitting diode device, the method comprising:
   detecting a failure state of the organic light emitting diode device and generating, in response to a detected failure state that has a duration equal to or larger than a first time interval, a decision signal, the failure state being a short defect, and
   in response to the decision signal, bypassing and deactivating the organic light emitting diode device.

* * * * *